UNITED STATES PATENT OFFICE

ALBERT JAN KLUYVER AND MARINUS ADRIANUS SCHEFFER, OF DELFT, NETHER-
LANDS, ASSIGNORS TO THOMAS HERMANUS VERHAVE, SENIOR, OF DELFT, NETHER-
LANDS

PROCESS FOR THE PREPARATION OF 2.3-BUTYLENE-GLYCOL FROM CARBOHYDRATES

No Drawing. Application filed May 21, 1929, Serial No. 364,934, and in the Netherlands July 10, 1928.

It has been known for a considerable time that several carbohydrates and related compounds are fermented by some kinds of bacteria with formation of 2.3-butylene-glycol besides other fermentation products. Thus Harden and Walpole (Proceedings Royal Society, London, Series B, vol. 77 (1906) page 399-405), showed that, under certain conditions there are formed by bacterium lactis aerogenes fairly considerable quantities of 2.3-butylene-glycol from glucose and from mannite. Also in the case of a number of other kinds of bacteria the same fact has been established, and the number of kinds of bacteria which are capable of forming small quantities of 2.3-butylene-glycol and the related acetyl-methyl-carbinol from widely divergent compounds, has been proved to be very large.

While the microbiological production of 2.3-butylene-glycol has been known for more than 20 years, hitherto no manufacture on a technical scale of 2.3-butylene-glycol has been based on these facts. This cannot be wondered at if one remembers that the conditions, which in Harden & Walpole's experiments proved to be necessary to obtain a complete fermentation of glucose and the like, were of such a nature that there could be no question of a technical application. In order to obtain complete fermentation of a solution of glucose and the like of only 2% strength, it proved to be necessary to add to the solution to be fermented 1% of proteins, which had been broken down in a special way, i. e. in the form of the expensive peptone, and even then the fermentation required not less than a month for completion.

Now the process of this invention is based on the new and unexpected observation that on the one hand it is possible to avoid completely using the said expensive raw materials and to subject instead thereof easily obtainable raw materials to a 2.3-butylene-glycol fermentation, and on the other hand to ferment much higher sugar concentrations, the operation being complete in about one twentieth of the formerly specified time or even less.

As raw materials there have been proved useful: maize- and potato-mashes, which may or may not be subjected first to a saccharification, either by means of malt-diastase or of michrobial diastase or of acids; further mashes of rye, barley, wheat, oats, buckwheat, cassava and similar starchy raw materials; furthermore raw materials containing sugar, as beet molasses, cane molasses, sorghum, maple and palm sugar syrups, in short all raw fermentable carbohydrate materials which have been applied at any time for the technical manufacture of spirit. In addition raw materials containing milk-sugar, such as whey, skimmed milks and the like have been proved to be quite useful. For convenience of definition, all the aforesaid raw materials suitable for use in practicing the process may be generically referred to as natural complex organic products containing or yielding one or more carbohydrates which are fermentable as such or upon saccharification; and it is to be noted also that these natural products always contain, in association with said carbohydrates, varying small quantities of substances, including organic nitrogen compounds, which serve as nutrient or assisting agents for bacterial fermentation when supplemented by the addition of certain inexpensive nutrient or assisting substances in accordance with the present invention, all as more fully hereinafter set forth. The expression "natural complex organic product", employed in certain of the appended claims, is to be understood in the sense required by the foregoing definition.

The use of these raw materials in the said fermentation process has now been proved possible, because it has been found that from these widely divergent materials containing starch and/or sugar, when mixed with nitrogen compounds, phosphates and carbonates, in so far as these bodies are not already present therein, mashes can be prepared, which, on fermentation with clostridium polymyxa, with aerobacter aerogenes or with a bacterium having a corresponding fermenting power, are capable of giving 2.3-butylene-glycol therefrom.

By the term "corresponding fermenting power" the faculty of fermenting sugars with formation of 2.3-butylene-glycol is to be understood.

The raw carbohydrate materials used do not generally contain a sufficient proportion of nitrogen compounds which are soluble or can be made soluble, and of phosphates and carbonates; however, by addition of nitrates, inorganic ammonium salts, urea or the like, also phosphates, such as superphosphate, and finely divided insoluble carbonates, the mashes made from such raw materials give a medium which is altogether suitable for the 2.3-butylene-glycol fermentation.

By a suitable mixing of these raw materials it has been proved possible with certain kinds of bacteria, such as clostridium polymyxa, aerobacter aerogenes and many others, to bring about complete fermentation of mashes with high contents of soluble carbohydrates, up to 15 and 20%, in periods of time (e. g. ordinarily less than two days) sufficiently short to allow the process to be carried out commercially. So for instance, it has been proved possible to bring about complete fermentation within 36 hours of cane and beet molasses in suitable dilution and with addition of small quantities of superphosphate and calcium carbonate, whereby high yields of butylene-glycol, for example an amount equivalent to 30–50% of the sugars present in the molasses used, were obtained.

Moreover alcohol is also obtained, for instance 16 to 40% of the fermented sugar; this can be used for the normal preparation of spirit. In presence of the said nutrient salts the fermenting power of the different kinds of bacteria may be increased considerably in the fermenting mash by artificially aerating the same (as distinguished from merely permitting natural access of air to the surface of the mash). This may be accomplished, for example by blowing in oxygen, either mixed or not with other gases (air), and this without any considerable change in the nature and relative proportions of the fermentation products. In these cases it has been found useful to wash the exhaust air with water to prevent alcohol losses.

Since it has been found that relatively high concentrations of butylene-glycol, in contrast to relatively small quantities of alcohol, do not interfere with the fermentation capabilities of the bacteria, it may be of advantage to distil off the alcohol either under diminished pressure or not and use the residue already containing butylene-glycol for the preparation of a new mash. Thus, to the residue may be added a fresh portion of more concentrated mash similar to the original mash, the mixture reinoculated and, after further fermentation, alcohol again distilled off. These operations may be repeated one or more times and butylene-glycol eventually separated from the final fermentation mixture.

In this way comparatively high concentrations of butylene-glycol may be obtained, diminishing the costs of recovery.

The butylene-glycol is subsequently separated by evaporation from the fermented mashes in a vacuum still or other evaporator and/or by extraction of the residual matter with ether or similar solvents or by distillation either under diminished pressure or not, either with direct or with indirect steam-heating, or combination of both.

The following examples illustrate the invention:

Example I 3000 kilos of potatoes with a starch content of 20% are treated in a steam-heated closed vessel in such a way that in 30 minutes a pressure of 3 atmospheres is attained. The mass thus obtained is mashed in the usual way in a mash tun with 75 kilos of malt. The mash is sterilized by heating to boiling temperature after the saccharification and then cooled to 41° C. in a closed apparatus which has been previously sterilized; there are then added 25 kilos of superphosphate and 19 kilos of well ground limestone and the whole is mixed with 200 litres of a mother culture of aerobacter aerogenes in malt-extract. When gas evolution has started, air is blown through the liquid at a speed of 25 m³ per hour. After a period of time varying from 33 to 39 hours the fermentation is finished. From the fermented mash 130 litres of spirit of (alcohol) of 95% strength are recovered by distillation and rectification. By evaporation, followed by vacuum distillation, 235 kilos of crude 2.3-butylene-glycol with a content of 92% are recovered.

Example II 1400 kilos of cane molasses are mixed with 3500 litres of water and 40 kilos of finely ground phosphorite and the mixture is sterilized by heating for 15 minutes at boiling temperature. Subsequently 50 kilos of ammonium sulphate and 35 kilos well-ground limestone are added. After cooling to 43° C. there are introduced 300 litres of a pure culture of clostridium polymyxa in whey. After 2 hours a start is made with blowing in air at a speed of 30 m³ per hour. The air escaping from the closed fermentation vessel is led into a tun containing water whereby the alcohol carried by the air is retained. The fermentation is finished after 24–36 hours. The fermented mash with the wash liquid is worked up as indicated in Example I. The yield amounts to 175 litres of spirit of 95% strength and 183 kilos of raw 2.3-butylene-glycol with a content of 92%.

From the foregoing typical examples, it will be seen that, when employing artificial aeration in carrying out the new process practically, the rate or speed of aeration may desirably be on the order of at least about one-half to one cubic meter of air per hour per hectolitre of fermentation mixture or mash.

What we claim is:

1. In the microbiological preparation of 2.3-butylene-glycol, the process which comprises preparing a sterilized mash containing a fermentable carbohydrate, a nitrogen compound, a phosphate and a carbonate, inoculating at a temperature between 25° and 50° C. with a culture of bacteria capable of producing 2.3-butylene-glycol in substantial quantity, blowing air through the mash during the ensuing fermentation, and separating resultant butylene-glycol.

2. In the microbiological preparation of 2.3-butylene-glycol, the process which comprises preparing from a natural complex organic product a mash containing sugar, a nitrogen compound, a phosphate and a carbonate, inoculating at a temperature between 25° and 50° C. with a culture of bacteria capable of producing 2.3-butylene-glycol in substantial quantity, blowing air through the mash during the ensuing fermentation, and separating resultant butylene-glycol.

3. In the microbiological preparation of 2.3-butylene-glycol, the process which comprises preparing a mash, containing a fermentable carbohydrate, a nitrogen compound, a phosphate and a carbonate, inoculating at a suitable temperature with a culture of bacteria capable of producing 2.3-butylene-glycol, blowing air through the mash during the ensuing fermentation in such amount that the process is accelerated but no substantial changes are caused in the nature and relative proportions of the fermentation products formed, and separating resultant butylene-glycol.

4. In the microbiological preparation of 2.3-butylene-glycol, the process which comprises preparing a mash containing carbohydrates, nitrogen compounds, phosphates and carbonates, inoculating at a temperature between 25° and 50° C. with a culture of bacteria capable of producing 2.3-butylene-glycol and continuing the ensuing fermentation until a substantial proportion of butylene-glycol has been formed, then blowing air through the mash until the fermentation is substantially completed, and washing the escaping gases to recover volatile matter.

5. In the microbiological preparation of 2.3-butylene-glycol, the process which comprises preparing a sterilized mash containing sugar, nitrogen compounds, phosphates and carbonates, inoculating at a temperature between 25° and 50° C. with a culture of bacteria capable of producing 2.3-butylene-glycol and continuing the ensuing fermentation until a substantial proportion of butylene-glycol has been formed, then blowing air through the mash, and washing the escaping gases to recover volatile matter.

6. In the microbiological preparation of 2.3-butylene-glycol, the process which comprises preparing a mash containing a fermentable carbohydrate, a nitrogen compound, a phosphate and a carbonate, subjecting such mash to fermentation with bacteria capable of producing 2.3-butylene-glycol, distilling off the alcohol formed, adding to the residual mash a further portion of a more concentrated mash generally similar to the original mash, reinoculating with bacteria capable of producing 2.3-butylene-glycol, subjecting said mash to fermentation, and recovering resultant alcohol and butylene-glycol.

7. In the microbiological preparation of 2.3-butylene-glycol, the process which comprises preparing a mash containing a fermentable carbohydrate, a nitrogen compound, a phosphate and a carbonate, subjecting such mash to fermentation with bacteria capable of producing 2.3-butylene-glycol, distilling off resultant alcohol, adding to the residual mash a further portion of a more concentrated mash generally similar to the original mash, reinoculating with bacteria capable of producing 2.3-butylene-glycol, subjecting the mash to fermentation, and repeating the foregoing cycle of operations at least once, each fermentation being continued until a substantial proportion of butylene-glycol has been formed.

8. In the microbiological preparation of 2.3-butylene-glycol, the process which comprises preparing from a natural complex organic product a mash containing a fermentable carbohydrate, a nitrogen compound, a phosphate and a carbonate, subjecting such mash to fermentation with bacteria capable of producing 2.3-butylene-glycol, distilling off resultant alcohol, adding to the residual mash a further portion of a more concentrated mash generally similar to the original mash, reinoculating with bacteria capable of producing 2.3-butylene-glycol, subjecting the mash to fermentation, repeating the foregoing cycle of operations several times, and then recovering butylene-glycol from the resultant concentrated solution thereof.

9. In the manufacture of butylene-glycol, the process which comprises preparing an aqueous fermentation mixture having a fermentable carbohydrate content substantially in excess of 2 per cent and containing nutrient agents including a phosphate assisting fermentative bacterial action, inoculating the mixture with a culture of bacteria capable of producing butylene-glycol in substantial quantity, effecting rapid fermentation with the aid of air blown through the mixture in such amount that the process is accelerated but no substantial changes are caused in the nature and relative proportions of the fermentation products formed, and separating resultant butylene-glycol from the fermented mixture.

10. In the manufacture of butylene-glycol, the process which comprises preparing an aqueous fermentation mixture from a natural complex organic product, which product contains a fermentable carbohydrate in association with substances capable of serving as nutrient or assisting agents in fermentation, adding to the mixture supplemental nutrient material, including a phosphate, to assist fermentation, inoculating with a culture of bacteria capable of producing butylene-glycol, blowing air through the mixture in such amount that the process is accelerated but no substantial changes are caused in the nature and relative proportions of the fermentation products formed, allowing fermentation to continue until a substantial quantity of butylene-glycol has been produced, and then separating it from the mixture.

11. In the manufacture of butylene-glycol, the process which comprises mashing a starchy vegetable product containing protein, adding phosphatic material to the mash, inoculating with a culture of bacteria capable of producing butylene-glycol in substantial quantity, conducting the fermentation with the aid of air blown through the mixture in such amount that the process is accelerated but no substantial changes are caused in the nature and relative proportions of the fermentation products formed, and separating resultant butylene-glycol.

12. In the manufacture of butylene-glycol, the process which comprises preparing a potato mash and saccharifying the same by means of malt, sterilizing the saccharified mash, adding thereto a phosphate and an insoluble carbonate, inoculating the mash with a culture of aerobacter aerogenes, artificially aerating the mixture after fermentation has begun, and separating resultant butylene-glycol after fermentation has progressed to a substantial extent.

13. In the manufacture of butylene-glycol, the process which comprises fermenting a commercial sugar-containing material, included in the group consisting of a molasses, a sugar-containing syrup, whey, or the like, which contains naturally other organic and inorganic nutrient or assisting compounds, with a bacterial culture capable of producing butylene-glycol in substantial quantity, suitable quantities of a phosphate and a carbonate being added to assist fermentation, blowing air through the mixture in such amount that the process is accelerated but no substantial changes are caused in the nature and relative proportions of the fermentation products formed, and separating resultant butylene-glycol.

14. In the manufacture of butylene-glycol, the process which comprises fermenting a diluted molasses with a culture of clostridium polymyxa in the presence of added nutrient or assisting salts, blowing air through the mixture in such amount that the process is accelerated but no substantial changes are caused in the nature and relative proportions of the fermentation products formed, and separating resultant butylene-glycol.

15. In the manufacture of butylene-glycol, the process which comprises fermenting a diluted molasses with a culture of clostridium polymyxa in the presence of added nutrient or assisting salts, including a phosphate, an ammonium salt and an insoluble carbonate, blowing air through the mixture in such amount that the process is accelerated but no substantial changes are caused in the nature and relative proportions of the fermentation products formed, and separating resultant butylene-glycol.

16. In the manufacture of butylene-glycol, the process which comprises preparing an aqueous fermentation mixture having a fermentable carbohydrate content substantially in excess of 2 per cent and containing nutrient agents assisting fermentative bacterial action, inoculating the mixture with a culture of bacteria capable of producing butylene-glycol in substantial quantity, effecting rapid fermentation with the aid of artificial aeration at a rate of at least about one-half cubic meter of air per hour per hectolitre of mixture, whereby to obtain within a period of two days a yield of butylene-glycol equivalent in amount to a relatively large percentage (on the order of 30 to 50 per cent) of the soluble carbohydrate content of the starting mixture, and separating resultant butylene-glycol from the fermented mixture.

17. In the manufacture of butylene-glycol, the process which comprises mashing a starchy vegetable product containing protein, adding phosphatic material to the mash, inoculating with a culture of bacteria capable of producing butylene-glycol in substantial quantity, conducting the fermentation with the aid of artificial aeration, and separating resultant butylene-glycol, said mash being saccharified prior to inoculation, and the inoculation being effected with bacetria capable of producing butylene-glycol from sugars but not directly from starch.

18. In the manufacture of butylene-glycol, the process which comprises mashing a starchy vegetable product containing protein, adding phosphatic material to the mash, inoculating with a culture of bacteria capable of producing butylene-glycol in substantial quantity, conducting the fermentation with the aid of artificial aeration, and separating resultant butylene-glycol, said mash being saccharified by means of malt prior to inoculation, and a carbonate being also added to the mash.

In testimony whereof we hereunto affix our signatures.

ALBERT JAN KLUYVER.
MARINUS ADRIANUS SCHEFFER.